Sept. 21, 1954

O. V. WOODARD 2,689,591

LOG-PEELING MACHINE HAVING CUTTER AND
LOG-HANDLING CARRIAGES MOVABLE ON
TRANSVERSELY EXTENDING TRACKWAYS

Filed June 26, 1953

Omar V. Woodard
INVENTOR.

BY *Clarence A. O'Brien*
*and Harvey B. Jacobson*
Attorneys

Sept. 21, 1954
O. V. WOODARD
2,689,591
LOG-PEELING MACHINE HAVING CUTTER AND
LOG-HANDLING CARRIAGES MOVABLE ON
TRANSVERSELY EXTENDING TRACKWAYS
Filed June 26, 1953
6 Sheets-Sheet 2
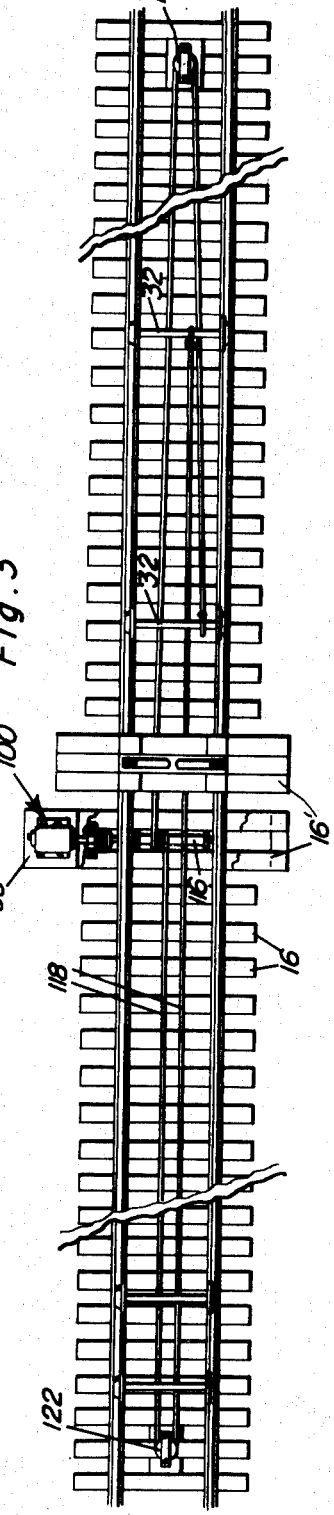
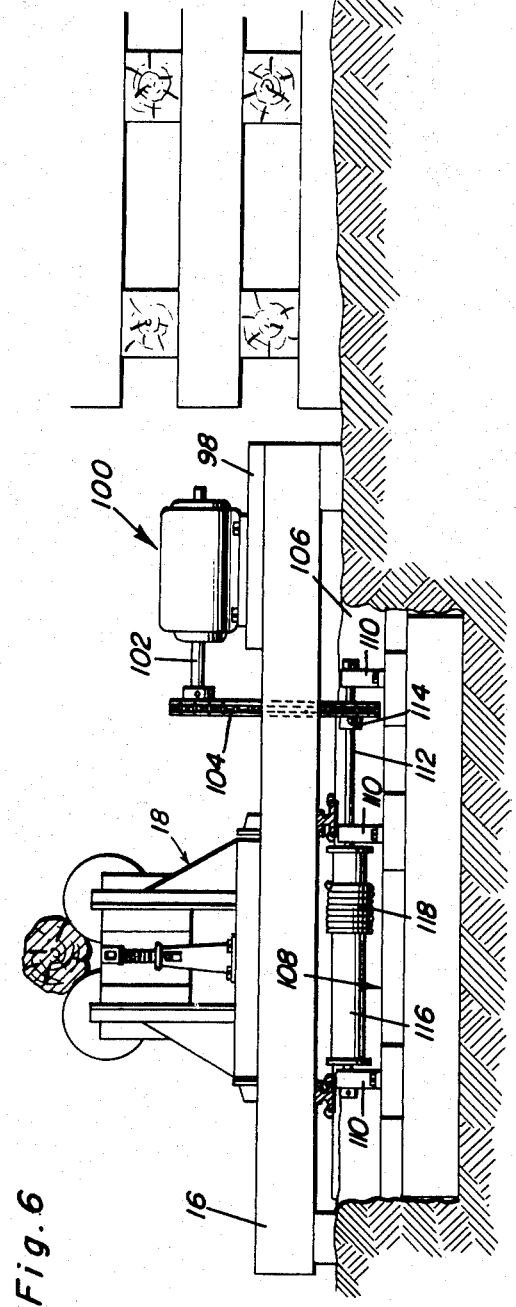
Omar V. Woodard
INVENTOR.
BY
Attorneys

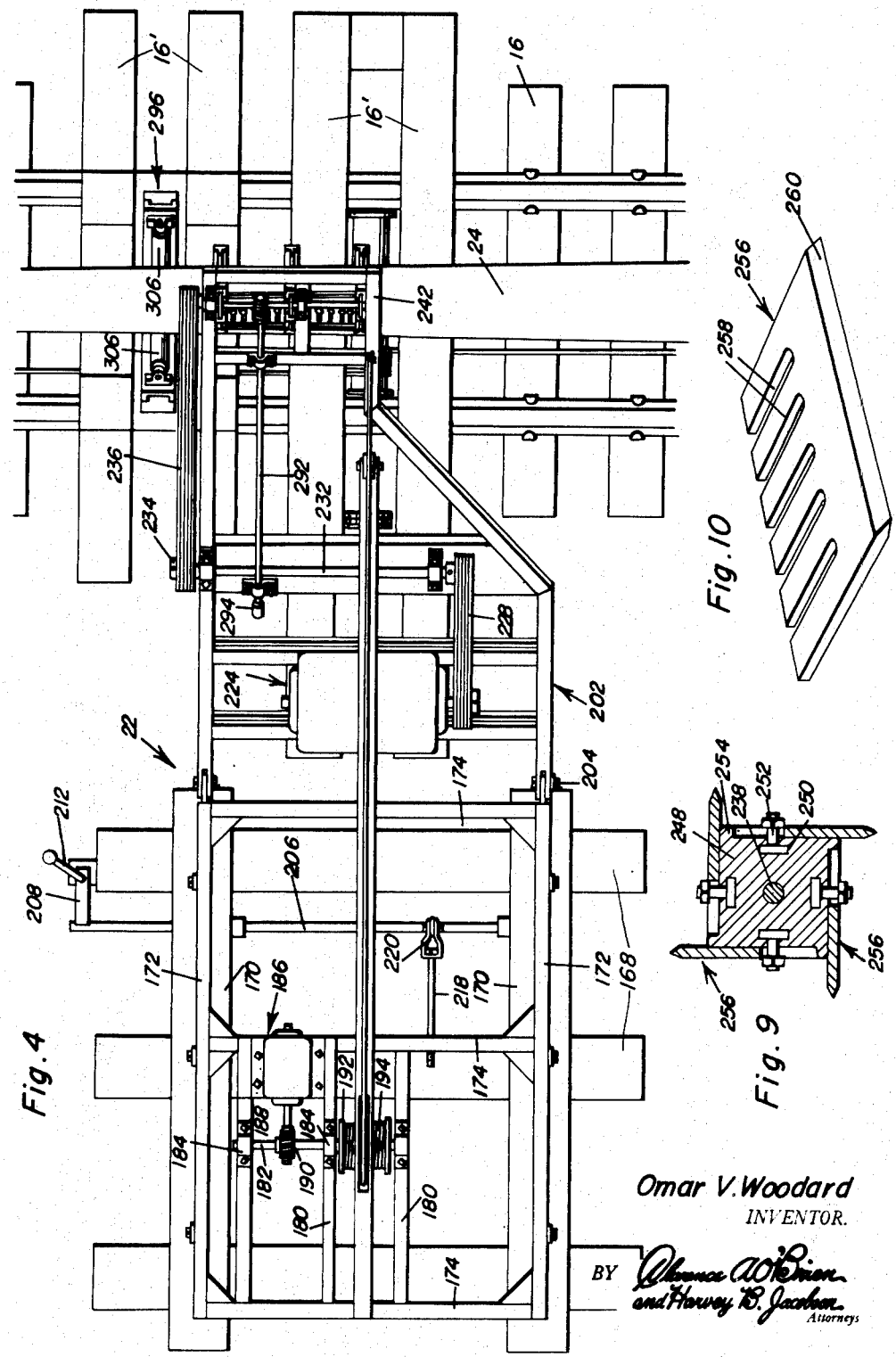

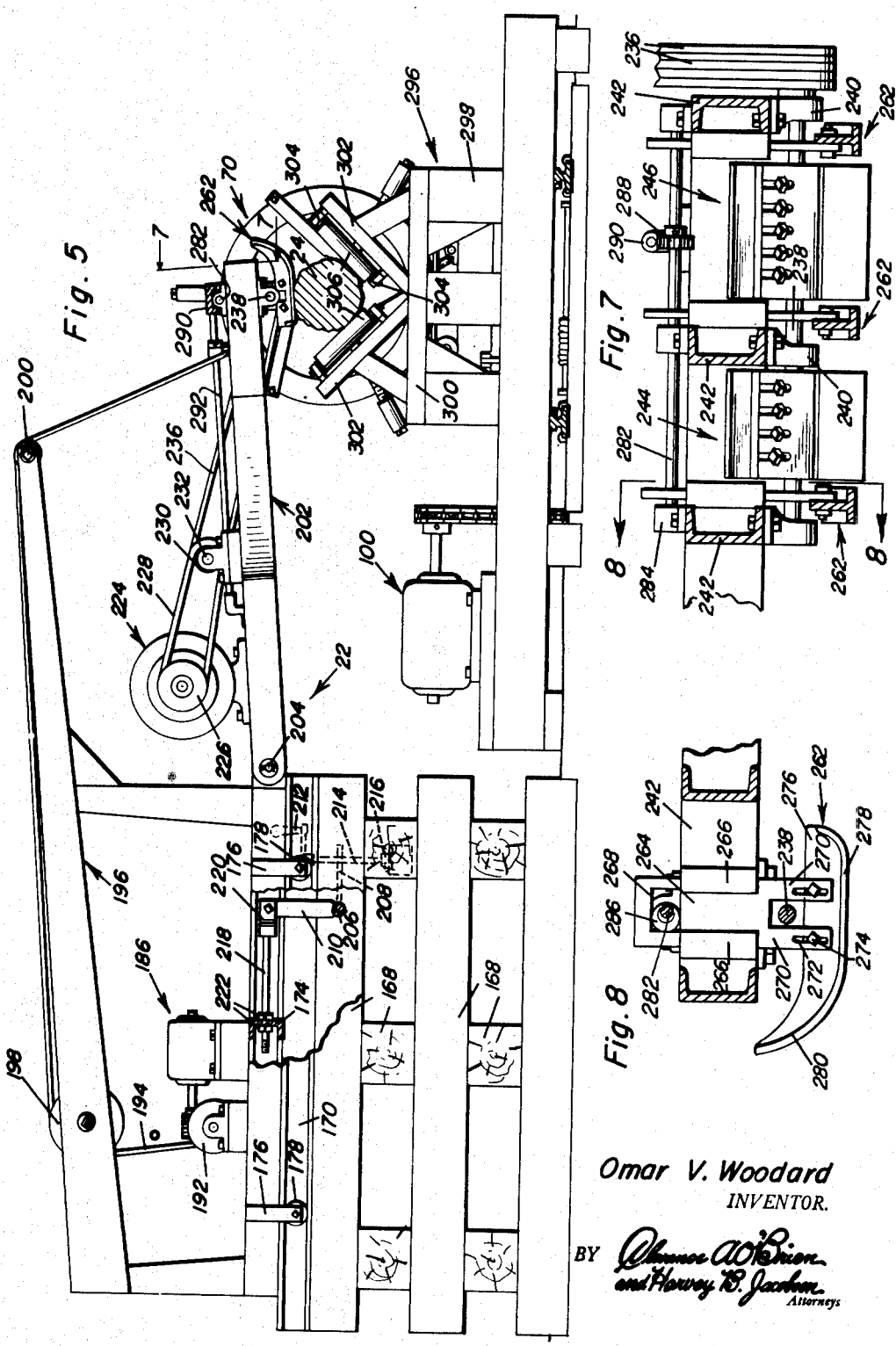

Sept. 21, 1954   O. V. WOODARD   2,689,591
LOG-PEELING MACHINE HAVING CUTTER AND
LOG-HANDLING CARRIAGES MOVABLE ON
TRANSVERSELY EXTENDING TRACKWAYS
Filed June 26, 1953   6 Sheets-Sheet 5

Omar V. Woodard
INVENTOR.

BY
Attorneys

Sept. 21, 1954 — O. V. WOODARD — 2,689,591
LOG-PEELING MACHINE HAVING CUTTER AND
LOG-HANDLING CARRIAGES MOVABLE ON
TRANSVERSELY EXTENDING TRACKWAYS
Filed June 26, 1953 — 6 Sheets-Sheet 6
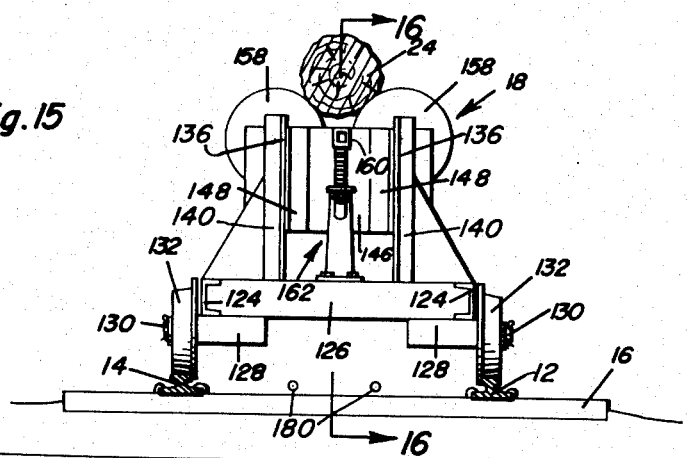
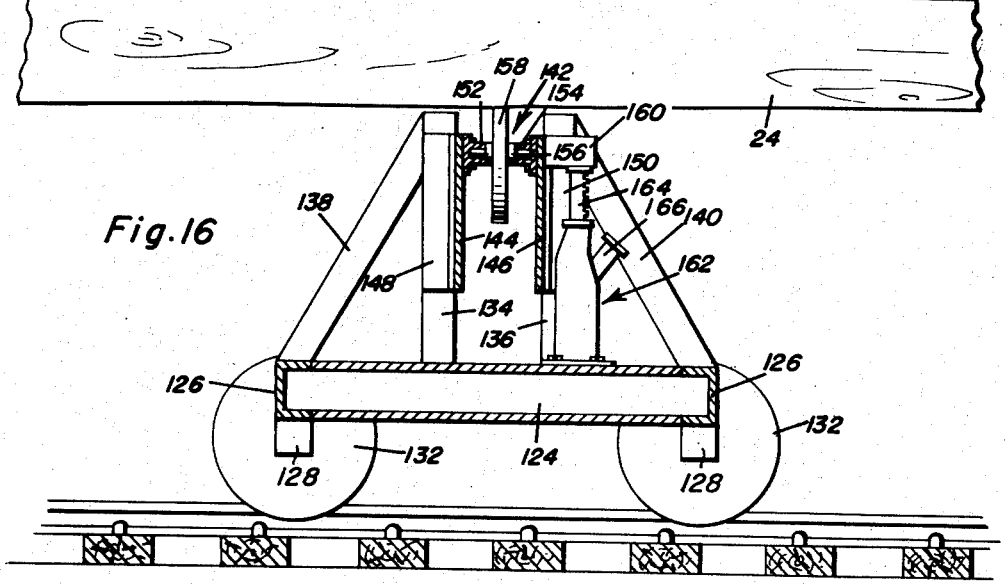
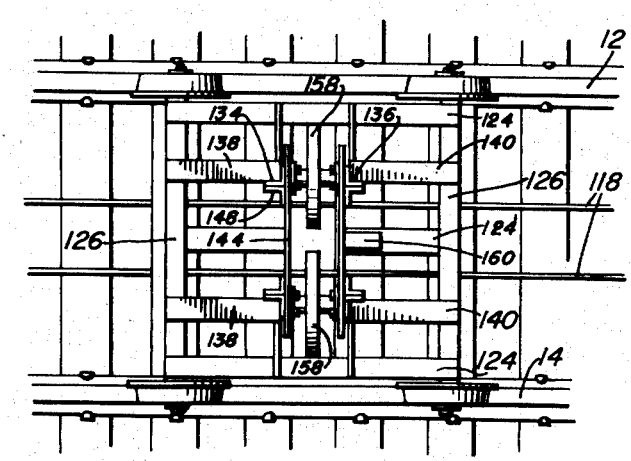
Omar V. Woodard
INVENTOR.

Patented Sept. 21, 1954

2,689,591

UNITED STATES PATENT OFFICE 2,689,591

LOG-PEELING MACHINE HAVING CUTTER AND LOG-HANDLING CARRIAGES MOVABLE ON TRANSVERSELY EXTENDING TRACKWAYS

Omar V. Woodard, Everett, Wash.

Application June 26, 1953, Serial No. 364,277

4 Claims. (Cl. 144—208)

This invention relates generally to that type of machine known in the industry as log peelers or barkers and this invention pertains more particularly to an improved form of such machine capable of handling all lengths and diameters of logs, the machine being in general readily adapted for the use to which it is intended.

A primary object of this invention is to provide a machine for peeling or barking logs which permits a most rapid and efficient performance in the peeling or barking of logs, the same being adapted to handle logs of widely ranging diameters and lengths, all with equal facility.

Another object of this invention resides in the provision of an improved form of log peeler which effects a positive rotation of an associated log at all times, thereby allowing a continuous and progressive peeling action.

A further object of this invention is to provide a machine in accordance with the foregoing object which effects its peeling operation irrespective of the lack of uniformity in a log, that is, regardless of the amount of taper, out of round or crookedness of the log.

Still another object of this invention is to provide a machine in conformity with the preceding objects wherein the machine is capable of being adjusted during its cycle of operation to allow and compensate for irregularities in a log.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a plan view of the trackway and carriage feeding assembly;

Figure 4 is a plan view of a portion of the assembly showing the tool mechanism on enlarged scale;

Figure 5 is an elevational and sectional view of the assembly shown in Figure 4, as indicated by the section line 5—5 in Figure 1;

Figure 6 is a transverse section through a portion of the assembly showing details of the feeding mechanism, as indicated by the section line 6—6 in Figure 2;

Figure 7 is a vertical section through the boom assembly, as indicated by section line 7—7 of Figure 5, and shows details of the cutter mechanism on an enlarged scale;

Figure 8 is a vertical section taken substantially along the plane of section line 8—8 of Figure 7, showing details of one of the guide shoes;

Figure 9 is a transverse section taken through one of the cutter heads and shows details on an enlarged scale;

Figure 10 is an enlarged scale perspective view of one of the cutter blades;

Figure 15 is a right end elevation and sectional view of one of the support carriages, as seen from the line 15—15 in Figure 1;

Figure 16 is a vertical section taken substantially along the plane of section line 16—16 of Figure 15; and Figure 17 is a plan view of the assembly shown in Figure 15.

Figure 1:
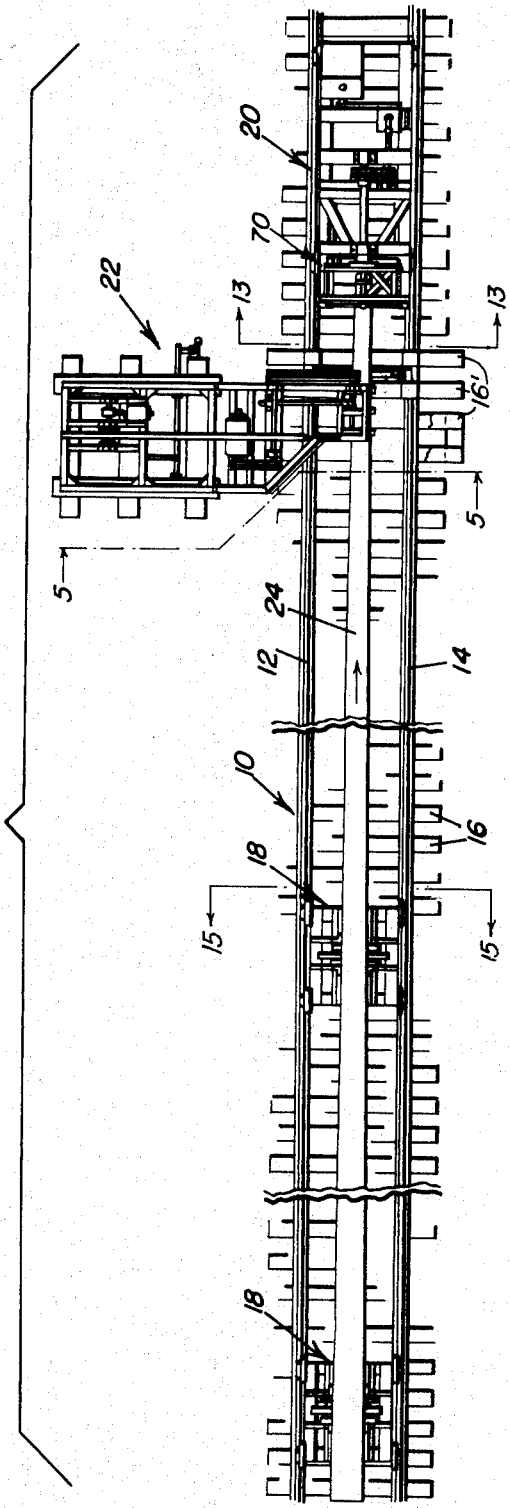
Figure 1 is a plan view of portions of the machine showing the general arrangement of parts during the peeling operation.
Figure 2:
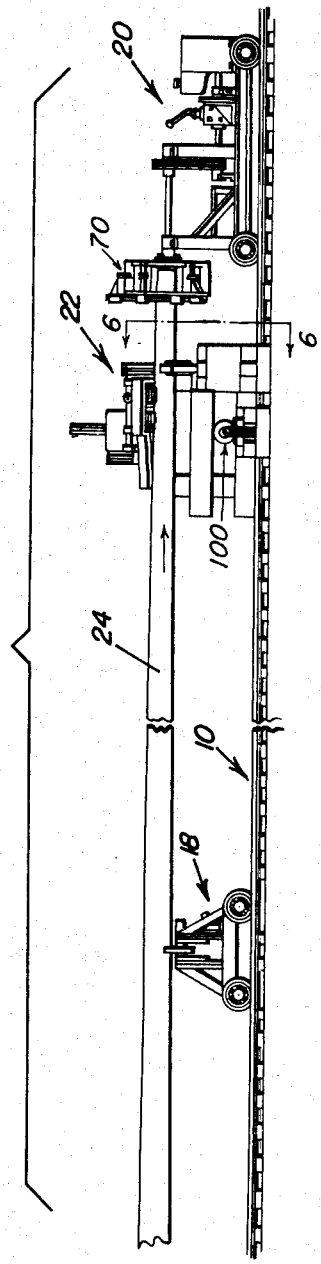
Figure 2 is an elevational view of the assembly shown in Figure 1.
Figure 11:
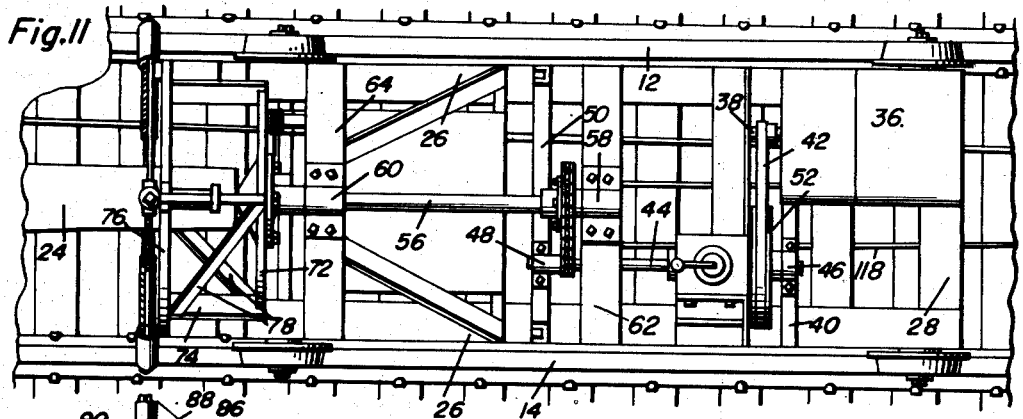
Figure 11 is an enlarged scale plan view of the drive carriage assembly.
Figure 12:
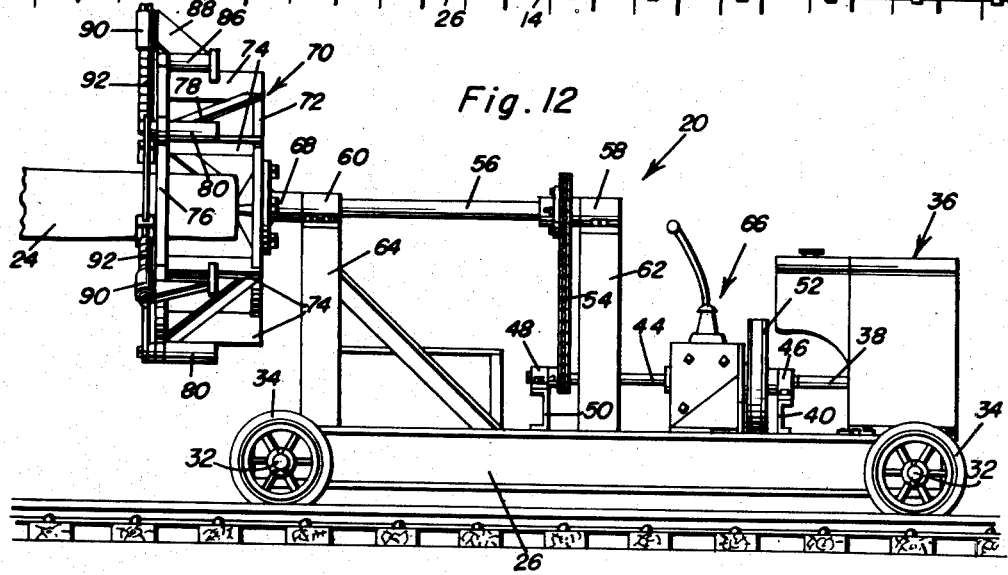
Figure 12 is an elevational view of the assembly shown in Figure 11.
Figures 13, 14:
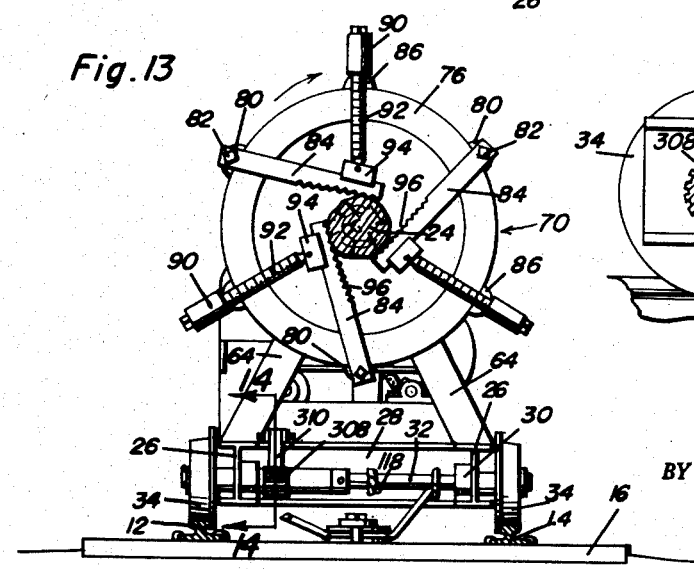
Figure 13 is a left end elevation and sectional view of the assembly shown in Figures 11 and 12, as indicated by the section line 13—13 in Figure 1.
Figure 14 is a vertical section taken substantially along the plane of section line 14—14 of Figure 13.

With reference now more particularly to Figures 1 and 2 wherein the general layout of the assembly is shown, reference numeral 10 indicates generally the trackway forming one of the main portions of this machine and which includes rail members 12 and 14 suitably supported on crosstie members 16 in a well known manner and reference numeral 18 indicates generally a pair of support dollies mounted for movement along the trackway as will be subsequently apparent. Reference numeral 20 indicates generally the driver assembly also movable along the trackway in a manner subsequently apparent, while reference numeral 22 indicates generally the tool assembly which operates to perform the actual peeling or barking operation. For the sake of clarity, the operation of the machine is such that the driver assembly 20 is adapted to firmly engage one end of a log 24 and rotate the same at a predetermined speed so that rotary cutter members on the tool assembly 22 will perform barking operations on the log, means being provided for positively feeding the driver assembly and thus the log in a direction to the right in Figures 1 and 2 past the tool assembly which is stationary, the support dollies effecting their function of support on longitudinally spaced portions of the log.

Referring now more particularly to Figures 11-14, it will be seen that the driver assembly includes a pair of longitudinal frame members 26 which may be of I-beam configuration as shown or other suitable construction and which are interconnected by suitable cross members 28 in the manner shown. Bearing assemblies 30 are provided on opposite sides of the frame at either end thereof and these bearings rotatively receive axles 32 to which wheel members 34 are secured, these wheel members being flanged as shown for rolling contact with the rails 12 and 14.

A suitable engine indicated generally by the reference character 36 is attached at one rear corner of the frame and this engine includes a drive shaft 38 which may be supported by a suitable bearing on a cross member 40 and the free end of this drive shaft is provided with a pulley about which a belt 42 is trained. A jack shaft 44 is received in bearings 46 and 48 of cross members 40 and 50 respectively, and a pulley 52 on one end of this shaft cooperates with the belt 42 to derive rotation from the engine drive shaft 38. The opposite end of the jack shaft is provided with a sprocket about which a chain 54 is trained which, through a suitable sprocket, drives a power shaft 56 supported between bearings 58 and 60 at the upper ends of convergent upright members 62 and 64. A change speed transmission 66 is incorporated in the power train between the pulley 52 and the driving sprocket on the shaft 44 and it is to be understood that a suitable clutch mechanism is associated with the engine 36.

The free end of power shaft 56 is provided with a coupling flange element 68 by means of which the chuck assembly indicated generally by the reference character 70 is rigidly secured to this shaft. The chuck includes a rear disc 72 to which the coupling element 68 is directly attached and this disc is provided with circumferentially spaced, forwardly extending web members 74 whose forward ends are rigidly secured to an annular front plate 76. Brace members 78 may be provided for rigidifying the assembly. Sleeve members 80 are provided on alternate ones of the members 74 and these sleeves rotatably receive pivot bolts 82 by means of which the outer ends of chuck jaws 84 are pivotally secured to the sleeve. The remainder of the members 74 are provided with bracket lugs 86 from which diagonal arms 88 extend to terminate in threaded bosses 90 which are disposed radially of the chuck assembly. Clamping screws 92 extend through the bosses 90 and are provided at their inner ends with pivoted pressure blocks 94 which bear against the free ends of the chuck jaws 84 so that opposite toothed sides 96 thereof will firmly grasp the associated log 24. In this respect, it will be noted that the direction of rotation of the chuck is such as to effect a positive gripping action of the chuck jaws, that is, the direction of rotation will be clockwise as indicated by an arrow Figure 13.

Referring now more particularly to Figures 3 and 5, it will be seen that cross ties 16' overlie the rails 12 and 14 and provide a support for a platform 98 upon which a motor 100 is mounted, this motor including a drive shaft 102 having a suitable sprocket thereon for engagement with a chain 104. A suitable pit 106 is provided beneath the trackway which receives a platform assembly 108 upon which aligned bearings 110 are mounted, these bearings receiving a shaft 112 provided with a sprocket 114 in engagement with the chain 104. Secured to the shaft 112 is a drum 116 upon which an intermediate portion of a cable 118 is wound. At opposite ends of the trackway are provided idler pulleys 120 and 122 and it will be noted that the cable 118 runs in opposite directions from the drum 116 and has each run reeved over the corresponding pulley, each run then extending toward, and being secured to, a selected axle 32 of the driver assembly, this assembly being shown only diagrammatically in Figure 3. It will now be apparent that reverse motions of the motor 100 will effect movement of the driver assembly toward and away from the previously mentioned tool assembly.

Referring now more particularly to Figures 15-17, it will be seen that each of the support dollies 18 includes longitudinal outer and intermediate frame members 124 and 124' interconnected at opposite ends by cross members 126 and that suitable stub axle brackets 128 rotatably receive stub axles 130 upon which flange wheels 132 are mounted for engagement with the rail members 12 and 14. Pairs of corner posts 134 and 136 suitably braced as by members 138 and 140 provide guide members for a roller assembly 142. This assembly includes spaced parallel guide plates 144 and 146 positioned between the uprights as shown and provided with angle bracket pieces 148 and 150, the arrangement of the various surfaces of the upright and the guide members being such that the guide assemblies are constrained for vertical motion with respect to the upright. Each of the plates 144 and 146 is provided with aligned hub members 152 and 154 whose opposed portions are recessed to receive the opposite ends of pivot shafts 156 upon which guide wheels 158 are secured, it being apparent that two such guide wheels are provided on each dolly in horizontally spaced relation to receive therebetween the associated logs 24 for rotatably supporting the same. The plate 146 is provided with a support ear 160, and a ratchet jack mechanism 162 secured therebeneath to the frame of the dolly includes a movable lifting portion 164 and an operating lever 166, the member 164 being in engagement with the under surface of the associated bracket ear. In this manner, the entire guide assemblies and their associated support wheels can be moved vertically up and down with respect to the frame of the dolly for a purpose presently apparent.

Referring now more particularly to Figures 4 and 5, it will be seen that the tool assembly 22 includes a stationary support built up from various timbers 168 which support parallel channel members 170 which are rigidly secured thereto. A movable carriage assembly comprised of longitudinal frame members 172 and transverse frame members 174 is movably supported on these channel members by means of depending bracket legs 176 whose lower ends rotatably receive the axles of wheel members 178 received in the channel members in the manner shown. The carriage is also provided with short longitudinal frame members 180 to which a transverse worm shaft 182 is journaled as by a pillow block 184. A motor 186 is supported on the carriage and its drive shaft 188 is provided with a worm 190 in engagement with the shaft 182 to rotate the same to turn a drum 192 thereon for winding a cable 194 thereabout. A boom mechanism 196 carries pulleys 198 and 200 over which the cable 194 is trained and the free end of the cable is secured to a tool arm assembly 202 for raising and lowering the same, the inner end of this arm being pivotally secured as at 204 to the forward end of the carriage.

A transverse shaft 206 is journaled in the stationary support timbers and is provided at its outer end with an operating lever 208 and at its inner end with an actuating lever 210. A crank handle 212 is associated with a threaded crank rod 214 whose lower end is loosely swiveled in a base member 216 secured to the stationary support and this crank rod is threadedly engaged with the operating lever 208 to actuate the same and rotate the shaft 206 in response to rotation of the crank assembly. This, of course, effects rotation of the actuating lever 210 which is connected through a link 218 to one of the cross members 174 of the carriage, a clevis 220 pivotally securing one end of this link to the lever 210 and the other end of the link being loosely received through an aperture in the frame member 174 and provided with a nut 222 at either side thereof to impart the proper motion to the carriage. The purpose of this construction will be presently apparent.

The tool arm 202 is built up of various frame and cross members and supports a motor 224 having a drive pulley 226 connected through a belt 228 to a pulley 230 on one end of a cross shaft 232 suitably journaled to the tool arm. The opposite end of this shaft is provided with suitable pulley means 234 which connect through a belt 236 to a pulley on a tool shaft 238.

Referring now more particularly to Figure 7, it will be seen that the tool shaft 238 is journaled in various bearings 240 associated with various longitudinal frame members 242 which form a part of the tool arm and it will be seen that this shaft carries a roughing cutter assembly 244 and the finishing cutter assembly 246 in side by side relation. As seen in Figure 9, each of the tool members proper includes a generally rectangular head 248 securely fastened to the tool shaft 238 and provided in each face thereof with T-slots 250 within which headed fastening elements 252 are received. Each corner of the head forms shoulders 254 providing a stop for one side of a blade member 256, see Figure 10. These blade members are provided with a plurality of slots 258 extending from one side thereof and the opposite side or edge is bevelled as indicated by the reference character 260 to provide a cutting edge. Thus, both the roughing and the finishing cutters will peel the associated log 24 when they are engaged therewith.

To provide for the proper depth of the cutting tools, shoe assemblies 262 are provided. Referring now more particularly to Figure 8, each of the shoe assemblies comprises a support plate 264 whose opposite vertical edges are guidably received by a bracket 266 on one of the frame members 242 and each of the plates is provided with a rectangular aperture 268 adjacent its upper end and each is bifurcated at its lower end to present spaced feet 270 straddling the tool shaft 238. Each foot is provided with an elongated slot 272 receiving a fastening element 274 so that the feet are adjustable relative to the web 276 of each of the shoes, the bottom of the web being provided with a runner bar 278. In this respect, it will be noted that the shoes are of inverted T-shape in cross section and are upturned at their front end as indicated by the reference numeral 280. A cam shaft 282 is journaled transversely of the tool arm by means of bearings 284 and cam elements 286 thereon are received within the confines of the various rectangular openings 268 in the upper ends of the support plates 264 so that upon rotation of the cam shaft the various shoe assemblies will be moved vertically upwardly or downwardly, as desired. This varies the cutting depth of the tool members to compensate for various thicknesses of bark. To effect rotation of the cam shaft, the same is provided with a gear 288 with which a worm 290 engages, this worm being carried by a shaft 292 which is journaled longitudinally of the tool arm and which terminates at its free end in the crank 294 by means of which it may be manually rotated to effect the desired positioning of the shoe.

To effect further steadying of an associated log 24 a roller assembly 296 is provided, this assembly consisting essentially of upright post members 298 carrying at their upper end a transverse platform member 300 upon which angularly disposed roller brackets 302 are disposed. These brackets support aligned bearing members 304 which pivotally receive opposite ends of roller shafts carrying roller members 306, it being apparent that these roller members are disposed in V-relation as shown to cradle the log 24 therebetween. Of course, to accommodate various diameters of logs, since the chuck assembly 70 is not vertically adjustable, provision must be made for either spreading the individual rollers 306 or vertically adjusting them simultaneously in accordance with the diameter of the particular log being operated upon.

With reference once more to Figures 13 and 14, it is to be noted that a refinement may be made in the mechanism for moving the driver assembly backward and forward on the trackway. This refinement consists of journaling the flanged wheels 34 on the axles 32, or at least on one of the axles, and providing this axle with a ratchet wheel 308 with which a pawl 310 carried by the frame is engaged. In this manner, any slack in the cable 118 can be taken up by merely rotating the axle 32 to wind the cable therearound until it is sufficiently taut whereupon the pawl and ratchet mechanism will prevent unwinding of the cable as will be apparent.

In operation, it will be manifest that the log is first supported on the various dolly assemblies and upon the supporting assembly 296 and its smallest end engaged in the chuck assembly 70. The tool carriage is then moved toward or away from the log and the tool arm lowered so that the cutter members engage the bark directly over the center of the log, this being the most effective and desirable positioning of the cutter. Of course, the tool carriage will have to be moved back and forth to properly center the tool as the diameter of the log varies. The initial position of the driver assembly is of course adjacent the supporting assembly 296 and the normal feed of this driver will be to the right in Figures 1 and 2 so that cutting action occurs progressively from the smaller to the larger end of the log. When it is desired to commence operation of the machine, the motor 36 is started and the driver clutch is engaged therewith to rotate the chuck and the associated log. Simultaneously, the motor 224 is started to rotate the cutters and the shoes 262 may then be adjusted to maintain the proper depth of the tool, whereupon the motor 100 will be started to feed the driver assembly away from the cutting station for continuous debarking of the log. It will be, of course, appreciated that the dollies will be carried along with the log as it moves along the trackway under influence of the driver assembly but that the dollies will eventually engage against one of the elongated crossties 16' and be stopped thereby whereupon relative longitudinal motion between the various dollies and the log will take place since the dollies can no longer be moved along the trackway. This operation continues until the entire log has been debarked and the assembly positioned for the reception of the next log to be debarked.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A log peeling machine comprising a trackway having a first support member mounted for movement therealong, means on said member for frictionally engaging one end of a log, means on said member for driving the first means, a second support member mounted for movement along said trackway in spaced relation to the first support member, means on said second member for rotatably supporting an intermediate portion of said log, a tool assembly disposed adjacent said trackway between said first and second support members and including a peeling tool in engagement with said log for peeling the same, said tool assembly comprising a stationary support, a carriage on said stationary support movable toward and away from said trackway, means for selectively moving said carriage, and a boom pivotally secured to said carriage and carrying said peeling tool at its free end.

2. A log peeling machine comprising a trackway having a first support member mounted for movement therealong, means on said member for frictionally engaging one end of a log, means on said member for driving the first means, a second support member mounted for movement along said trackway in spaced relation to the first support member, means on said second member for rotatably supporting an intermediate portion of said log, a tool assembly disposed adjacent said trackway between said first and second support members and including a peeling tool in engagement with said log for peeling the same, said tool assembly comprising a stationary support, a carriage on said stationary support movable toward and away from said trackway, means for selectively moving said carriage, a boom pivotally secured to said carriage and carrying said peeling tool at its free end, and means for raising and lowering said boom.

3. A log peeling machine comprising a trackway, a first member supported for movement along said trackway and including means engaging a log for rotating the same about its longitudinal axis, a second member supported for movement along said trackway, said second member having means for rotatably supporting said log, a tool assembly disposed adjacent said trackway between said first and second members and including a peeling tool in engagement with said log for peeling the same, said tool assembly comprising a stationary support, a carriage on said stationary support movable toward and away from said trackway, means for selectively moving said carriage, and a boom pivotally secured to said carriage and carrying said peeling tool at its free end.

4. A log peeling machine comprising a trackway, a first member supported for movement along said trackway and including means engaging a log for rotating the same about its longitudinal axis, a second member supported for movement along said trackway, said second member having means for rotatably supporting said log, a tool assembly disposed adjacent said trackway between said first and second members and including a peeling tool in engagement with said log for peeling the same, said tool assembly comprising a stationary support, a carriage on said stationary support movable toward and away from said trackway, means for selectively moving said carriage, a boom pivotally secured to said carriage and carrying said peeling tool at its free end, and means for raising and lowering said boom.

References Cited in the file of this patent

UNITED STATES PATENTS

| Number | Name | Date |
|---|---|---|
| 1,249,332 | Cline | Dec. 11, 1917 |
| 1,379,768 | Larson | May 31, 1921 |
| 1,438,904 | Crouse et al. | Dec. 12, 1922 |
| 2,401,500 | Ockfen | June 4, 1946 |
| 2,540,994 | Rodgers | Feb. 6, 1951 |
| 2,652,867 | Boswell | Sept. 22, 1953 |

FOREIGN PATENTS

| Number | Country | Date |
|---|---|---|
| 322,221 | Germany | June 23, 1920 |
| 115,700 | Sweden | Jan. 22, 1946 |